[11] 3,560,643

| [72] | Inventor | Charles L. |
| | | Malibu, Calif. |
| [21] | Appl. No. | 682,723 |
| [22] | Filed | Nov. 2, 1967 |
| [45] | Patented | Feb. 2, 1971 |
| [73] | Assignee | Hughes Aircraft Company |
| | | Culver City, Calif. |
| | | a corporation of Delaware |

[54] LINE SCANNING SYSTEM
10 Claims, 7 Drawing Figs.

| [52] | U.S. Cl. | 178/6.8, |
| | | 178/6.7, 178/7.7, 178/7.88; 350/7 |
| [51] | Int. Cl. | H04n 3/08 |
| [50] | Field of Search | 88/1(HVS); |
| | | 350/6, 7, 199; 178/6.7, 6.8, 7.6, 7.7, 7.88 |

...es Cited
UNITED STATES PATENTS

| 3,019,292 | 1/1962 | John | 350/7X |
| 3,294,903 | 12/1966 | Goldmark et al. | 178/7.6X |
| 3,316,348 | 4/1967 | Hufnagel et al. | 178/7.6X |
| 3,353,022 | 11/1967 | Schwartz | 350/6UX |

*Primary Examiner*—Richard A. Farley
*Assistant Examiner*—Daniel C. Kaufman
*Attorneys*—James K. Haskell and Walter J. Adam

ABSTRACT: A ground mapping system for obtaining images of terrain from a moving aircraft including a transmitter equipped to scan a terrain target area with a laser beam, a receiver adapted to electronically scan a focal surface on which reflected light images are formed, and a recorder for providing a record of the images formed on said focal surface thereby producing a visual representation of the observed terrain.

PATENTED FEB 2 1971  3,560,643

Charles E. Love,
INVENTOR.

BY

AGENT.

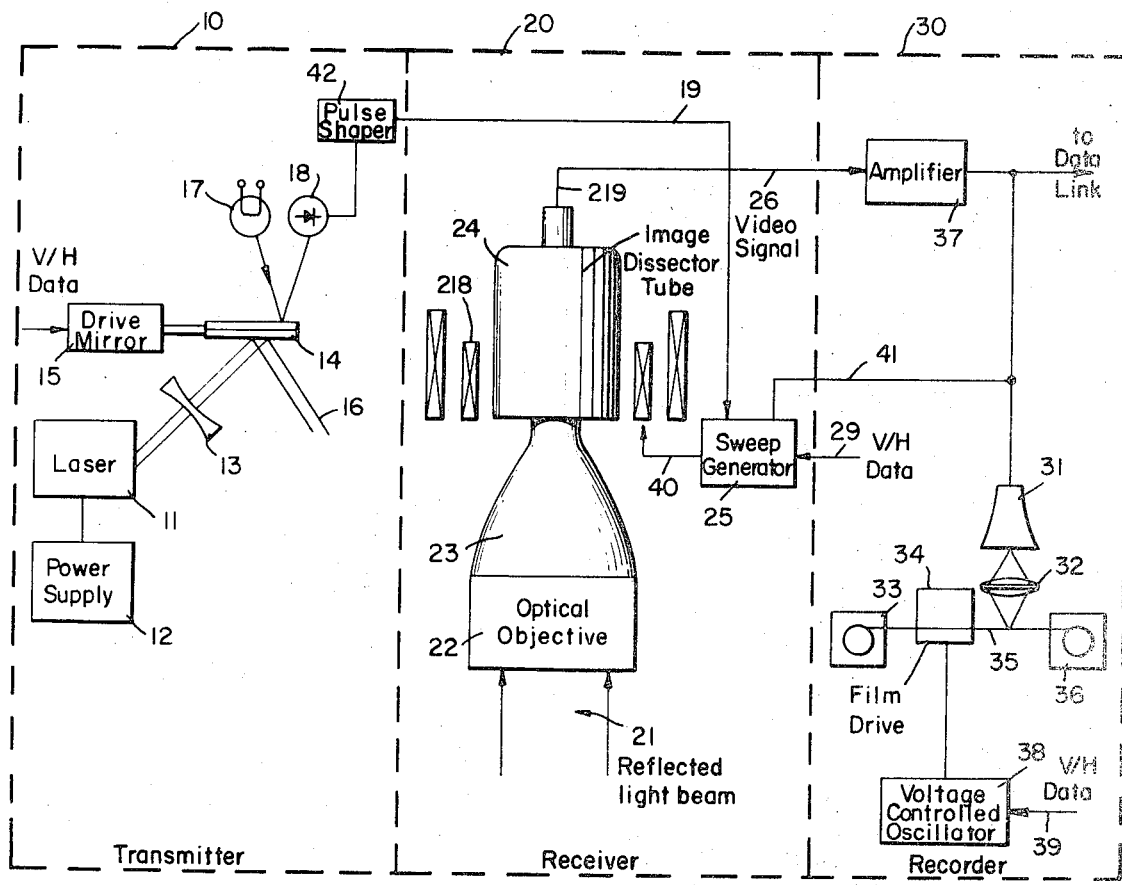
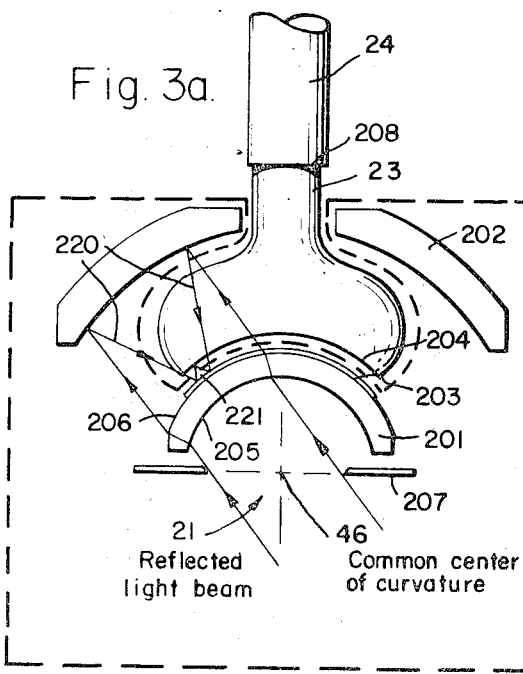
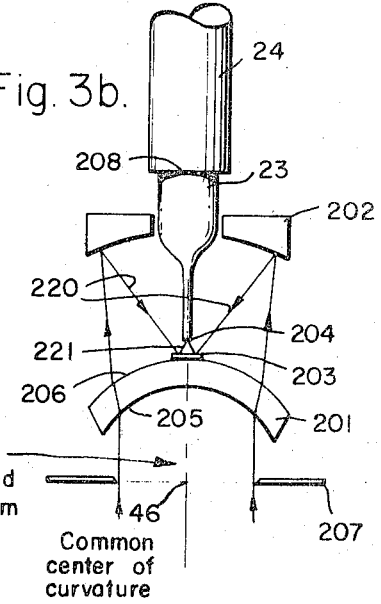

LINE SCANNING SYSTEM

BACKGROUND OF THE INVENTION

This invention relates to a ground mapping system which allows the taking of high resolution pictures at high velocity over altitude (V/h) ratios under extremely low intensity ambient light conditions. More particularly, the invention is directed to an improved mapping system wherein transmitted electromagnetic energy reflected from the surface under observation is focused on a focal plane surface which is then electronically scanned.

The standard approach to night photography such as from an aircraft has been to employ active illuminants in conjunction with various night cameras. Photo flash cartridges, electronic strobes and flash lamps are exemplary of devices used for illumination. In general, it has been found that photography utilizing these illuminants have a number of disadvantages. In particular, since the cameras are "wide open," i.e., sensitive to exposure over a large solid angle, extreme sensitivity to local scattering from haze results if the illuminant is near the camera as is the case with strobes and flash lamps. To avoid this scattering condition the illuminant must be tossed high and away from the camera before the film exposure. This release of incendiary materials from otherwise innocuous aircraft may sometimes have undesirable implications. The use of active illuminants also has the disadvantages of uneven illumination and visibility of the light source from the ground as well as having the disadvantage of possible confusion with bright environmental light conditions such as flash cartridge explosions resulting from bombing when such a system is used in connection with military operations.

As an alternative to the aforementioned standard approach, various mechanical scanning systems such as passive infrared scanners have been employed in the prior art. These mechanical scanning systems generally utilize one of two basic scanning techniques, which are respectively object plane scanning and image plane scanning. Due to the scanning systems being mechanical, however, said systems have been generally unsuitable for employment in high speed aircraft operated at low altitude conditions, no relative advantage being provided by using one technique rather than the other, due to inherent mechanical restrictions. Exemplary of such restrictions is the requirement of a large mirror in the receiving system which necessitates the use of a high power drive motor.

Electronic image plane scanning allows for a scanning system requiring no moving parts in the receiver, thereby overcoming the disadvantages implicitly accompanying mechanical systems.

Further, the laser offers the opportunity to provide high resolution pictures at high V/h ratios under extremely low ambient light conditions. This follows from two basic properties of the laser: (1) the beam is so well collimated that a relatively small loss occurs in illuminating the scene; and (2) the beam is so small that high velocity mechanical scanning can be easily accomplished. A system that employs a scanning pencil beam such as from a laser for illumination of a surface allows the use of a tracking receiver having a small field of view and thus provides a substantial advantage in the rejection of unwanted signals such as may result from ambient light, haze, and light sources on the surface or ground. Further, system resolution is determined by the cross-sectional size of the laser beam and low resolution optics may thus be employed when serving a light collecting function.

SUMMARY OF THE INVENTION

Briefly described, the present invention employs a transmitter equipped to scan a target surface or terrain area with a collimated pencil beam of coherent light such as a laser beam. Reflected energy is received by a receiver including an optical system for focusing images of the target surface derived from the reflected energy along a lineal focal surface. An image dissector tube used in combination with a fiber optic image converter is employed to electronically scan the focal surface on which said images are focused, thereby providing electronic image plane scanning. Video signals are developed as output signals by said image dissector tube. A suitable recorder such as one equipped with a cathode ray tube, focusing optics, and a recording medium such as film is employed to provide a permanent record of the video signals, thereby producing a photographic representation of the target surface or terrain area scanned by said collimated pencil beam of coherent light.

It is therefore an object of the present invention to provide an improved surface or ground mapping system capable of providing high resolution pictures at high V/h ratios under extremely low ambient light conditions.

It is a further object of this invention to provide means enabling the taking of night reconnaissance photos without attendant problems of flash lights or strobe lights.

Another object of this invention is to provide an image forming system that is substantially immune from problems that may result from uneven illumination, the visability of light sources from the ground, and bright environmental light conditions.

Still another object of this invention is to provide a surface terrain mapping system capable of developing signals suitable for telemetering or storage.

A still further object of this DRAWINGS is to provide a system employing improved focusing and electronic image plane scanning.

DESCRIPTION OF THE DRAWINGS

Other objects and many of the attendant advantages of this invention will be more readily appreciated as the same becomes better understood by reference to the following detailed description and considered in connection with the accompanying drawings in which like reference symbols designate like parts throughout the FIGS. thereof and wherein:

FIG. 2 is a schematic block and structural drawing illustrating the overall system in accordance with the invention;

FIGS. 3a and 3b are schematic orthogonal cross-sectional side views of a receiver optical system that may be utilized in the system of FIG. 2;

DESCRIPTION OF THE PREFERRED EMBODIMENTS

One of the most important needs for an adequate night sensor is the capacity to provide target discernability in the form of an image with quality characteristics permitting target detection and identification. Some daytime photography can now provide this capability. The system within the principles of the present invention may provide as an illustrative value, an angular resolution value of 0.5 milliradians, equivalent to a ground linear dimension of 3.0 inches at a flight altitude of 500 feet. This resolution capability represents highly useful performance when produced by a night sensor. It is to be noted that while many parameters may be utilized to totally describe image quality characteristics, the quantitative measure of resolution expressed in milliradians has been used to illustrate the system advantages.

Figure 1:
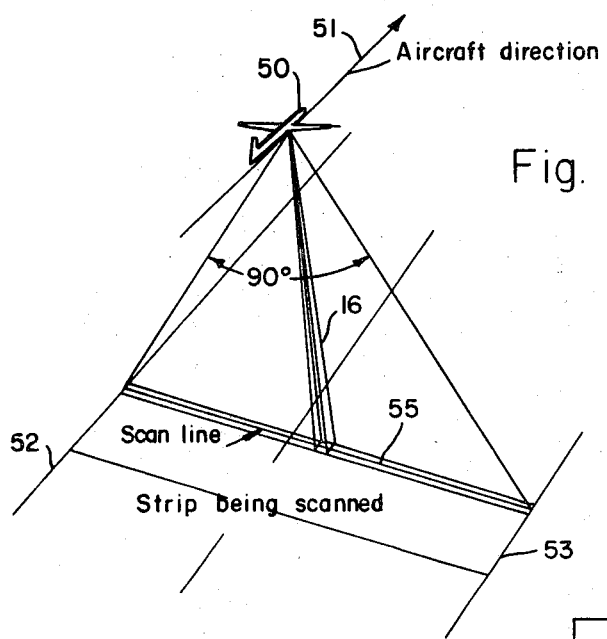
FIG. 1 is a diagram illustrating the basic scanning geometry of the system.

Referring now to FIG. 1, the system of the invention may, for example, employ a 90° field of view. It is to be noted that this field of view which may be from an aircraft 50 exceeds presently known night photography capabilities which generally are limited to a substantially smaller angular field. The aircraft 50 carrying the scanning system of the invention is assumed to be flying in a direction indicated by an arrow 51 at a velocity $V$ and at an altitude $h$. Lines 52 and 53 define an area beneath aircraft 50 and parallel to the longitudinal axis thereof which would be scanned by a laser beam 16. In order to provide contiguous coverage of the terrain situated between lines 52 and 53, there may be an overlap in the successive scanned sections indicated at 55.

With further reference to the drawings and particularly to FIG. 2 thereof, there is shown an embodiment of a laser terrain mapping system in accordance with the principles of this invention. Within dashed lines are the three major sections of the system, which are respectively a transmitter 10, a receiver 20, and an exemplary recorder 30.

The transmitter 10 is shown as comprising a laser 11 having a power supply 12. A suitable laser for providing terrain illumination would be an argon ion laser operated in a CW (continuous wave) mode having principal outputs at wavelengths of 4880 A (Angstroms) and 5145 A, for example. Lasers of this type are well-known in the art as described in an article by William B. Bridges entitled "Laser Oscillation in Singly Ionized Argon in the Visible Spectrum", Applied Physics Letters, Vol. 4, No. 7, Apr. 1964. Pages 128—130.

A laser beam 16 generated by laser 11 is directed through collimating optics 13 to a rotating mirror 14 which is rotated by a drive motor 15. The mirror 14 may have the form of a six sided prismatic mirror which is a type well-known in the prior art. The laser beam 16 is reflected from the mirror 14 as the transmitted beam and is consequently caused to scan a surface such as terrain at which it is directed in a repetitive pattern due to the rotation of the mirror 14. Notably, although a mirror having six sides is employed in the disclosed system it is clear that a mirror having a greater or lesser number of sides may be employed to provide contiguous ground scan coverage, the number of sides utilized being dependent on desired efficiency and mirror size, Although the mirror 14 and the drive motor 15 are illustrated as being two separate units, a hysteresis synchronous type motor contained within the mirror assembly may be used to rotate mirror 14. Also, the invention includes other types of driving and mirror systems, such as pyramidal mirrors, as well as any beam control system, such as an electro-optic system, that will provide the desired scan pattern.

The a laser beam developed by presently known lasers is inherently collimated to about two milliradians as it leaves the laser 11. However, as this beam spread is larger than the required resolution, a collimating device 13 is employed to bring the beam down to the desired 0.5 milliradian angular divergence. For example, a low power telescope of the Galilean type may be used for this purpose as the optical unit 13.

The receiver 20 detects light energy indicated at 21, which is reflected from the terrain under observation (not shown) and converts the reflected light energy 21 into a video signal representative of the characteristics of a resultant image. The time of reception of the reflected light energy 21 represents the range to the terrain features and the amplitude of said reflected light energy 21 represents the reflectivity characteristics of the terrain features. The major elements of receiver 20 include an optical objective system 22 which forms a line image of the scanned terrain strip 55 (FIG. 1), an image dissector tube 24, a fiber optics line-to-circle image converter structure 23 and associated electronic circuits such as a sweep generator 25 for furnishing signal synchronization and electron beam deflection control.

Referring to optical objective system 22 with more particularity, as shown in FIGS. 3a and 3b, said optical objective system 22 is of the concentric catadioptic type, often referred to as the Bouwers System, which provides the advantages of good light gathering capability, good image quality, high transmissivity, wide field of view, and reasonable size. This type of optical structure is described in a textbook by Bouwers, Achievements in Optics, L. Sevier Press, Netherlands 1950.

Figure 4:
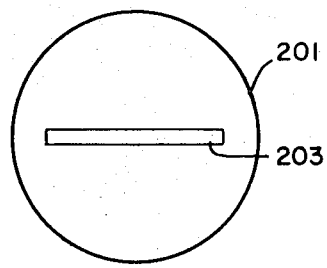
FIG. 4 is a schematic illustration of the physical orientation of a spherical corrector lens and secondary mirror used in the receiver optical system.

The graphical representation of FIGS. 3a and 3b show orthogonal cross-sectional side views of the optical objective system 22 of receiver 20. Optical objective system 22 comprises a spherical corrector lens 201 having a concave surface 205 and a convex surface 206, a spherical primary mirror 202, and a spherical secondary mirror 203 which is appropriately mounted on the convex surface 206 of the corrector lens 201, such as with an adhesive or by being deposited on said lens 201. The spherical corrector lens 201, the spherical primary mirror 202, and spherical secondary mirror 203 are concentrically oriented with each other. The term "spherical" is intended to mean that the respective surfaces of the lens and mirrors so described each have the curvature and are formed as a section of the surface of a sphere. An aperture stop 207 is situated at the common center of curvature 46. Since any straight line through the center of curvature 46 and the rays parallel to it can be considered as an axial bundle, as shown as 21, the image formed along a focal surface 204 will be free of such off-axis aberrations as coma, astigmatism, and distortion. A residual spherical aberration of the primary mirror will be canceled by the over-corrected spherical aberration of the corrector lens 201. Notably, an insignificant amount of obscuration is caused by the secondary mirror 203 mounted on the convex surface 206 of corrector lens 201 because the secondary mirror 203 is in the configuration of a narrow strip as is illustrated by FIG. 4. It is understood that it would be within the scope and spirit of the invention to substitute other suitable optical objective systems for the preferred objective system illustrated in FIGS. 3a and 3b.

Figure 5:
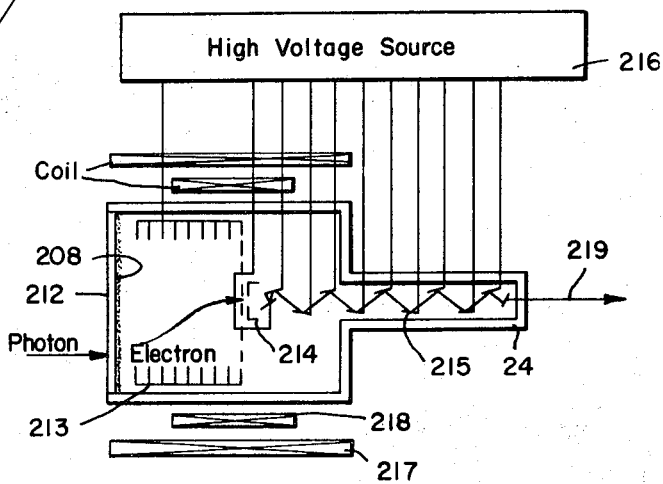
FIG. 5 is a schematic perspective drawing illustrating a fiber optic line-to-circle image converter that may be utilized in the system of FIG. 2, in accordance with the invention.
Figure 6:
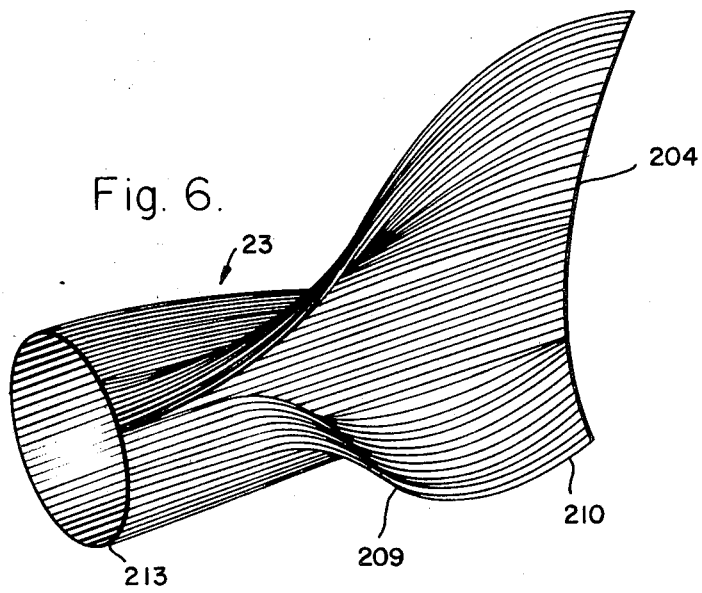
FIG. 6 is a schematic partly cross-sectional diagram illustrating an image dissector tube that may be utilized in the system of FIG. 2 in accordance with the invention.

The schematic perspective drawing of FIG. 5 shows a fiber optic line-to-circle image converter 23 as comprising a plurality of fiber bundles 209 arranged in a coherent configuration. As an example of the fiber optic structure, stock glass fibers having a diameter of 0.0004 inch and manufactured by the American Optical Company may be used to form each fiber bundle 209. Each of these glass fibers is formed with a core of glass having an index of refraction, for example, of 1.62. The core may be coated with a glass cladding having an index of refraction of 1.52 and thickness equal to one-tenth of the diameter of the core, which arrangement provides substantially total transmission of light entering the fiber ends. In this illustrated system, the fiber optic line-to-circle image converter 23 may be approximately one foot long. As shown in FIG. 5, end 210 of fiber optic line-to-circle image converter 23 is formed in the shape of a line having a slight curvature conforming to the curvature of focal surface 204 which is physically coincident therewith. The other end 211, of fiber optic line-to-circle image converter 23 is formed to have a circular transverse shape and is situated in operational adjacency to faceplate 212 (FIG. 6) of image dissector tube 24. The converter 23 allows the use of a relatively long lineal focal surface at end 210 with a relatively small circle at the end 211 which is compatible with a dissector tube having a relatively small circular faceplate. Also, the converter 23 allows a simplified and continuous scan to be used at the end 211, thus avoiding the need for complex deflection control at the image dissector tube 24. It is to be understood that it would be within the scope and spirit of the invention to modify end 210 of fiber optic image converter 23 to have any desirable transverse configuration such as that resembling the geometric shape of a square waveform, triangular waveform or a spiral.

The principal sensing element of receiver 20 is the image dissector tube 24 which effectively provides electronic scan of the illuminated ground strip 55 (FIG. 1) by electronically scanning successive portions of the curved lineal focal surface 204. The image dissector tube 24 generally serves as a photodetector device having a photocathode surface and provisions for accelerating, deflecting, and focusing the electrons emitted from the photocathode in a beam for final conversion into an electrical output signal. An exemplary image dissector tube capable of use in the invention is the ITT Industrial Laboratories, Type No. F4010 Vidissector.

Referring to the schematic partly cross-sectional diagram of FIG. 5, the image dissector tube 24 is shown to include a photocathode 208 which is deposited on the interior surface of a faceplate 212. The photocathode material may be any of the types well known in the prior art such as Silver-Oxygen-Cesium, or Tri-Alkali. It is to be understood that the principles of the invention are applicable to other types of scanning arrangements besides the illustrated image dissector tube. Upon the transfer of light images from focal surface 204 to photocathode 208 through fiber optic image converter 23, photoelectrons are emitted in response to the incident photons. An accelerating mesh 213 including conducting accelerating rings which are operatively coupled to a high voltage source 216 is situated within the evacuated environment of image dissector tube 24 in concentric juxtaposition to faceplate 21 and serves to accelerate the photoelectrons toward an aperture 214. During this travel of the photoelectrons a magnetic field which is provided by a solenoidal focus coil 217 confines each photoelectron to a spiral orbit such that the image initially formed at the photocathode 208 is reformed in the plane of aperture 214 without appreciable distortion or loss of photoelectrons.

The aperture 214 is formed of a metal plate containing a small hole that permits the passage of photoelectrons. Behind the hole is located an 11 stage secondary emission electron multiplier 215. As an example, the average gain per state stage is about 3.1 (at 150 volts dynode potential per stage), giving a total amplification of approximately 2.5 times $10^5$. This amplification in the multiplier 215 may be so high that later amplifiers introduce no appreciable degradation of the signal-to-noise ratio. Video signals appearing at an output lead 219 are applied as input signals to recorder 30 through an appropriate gain control circuit (not shown) available in the prior art.

Deflection coils 218 in the form of two pairs of coils having any suitable configuration well known in the prior art are mounted external to image dissector tube 24 and within the area encompassed by solenoidal focus coil 217. The deflection coils 218 serve to deflect in any desired direction the photoelectrons emitted from photocathode 208 in response to signals generated by the sweep generator 25 and applied to $10^5$. deflection coils 218 over a composite lead 40 (FIG. 2), signals having suitable waveforms being applied to deflection coils 218 in order to appropriately deflect said photoelectrons causing them to be directed through aperture 214. The focal surface 204 is thus electronically scanned in a substantially continuous and reliably controlled pattern.

Referring once again to FIG. 2, recorder 30 responds to the ground reflectivity information available from the receiver 20 in the form of electrical analogue signals and transforms said signals into a permanent picture on conventional photographic film. As shown, recorder 30 includes a cathode ray tube 31 to which video signals are applied from output lead 219 of image dissector tube 24 over a lead 26 through an amplifier 37. These video signals are applied to the intensity electrode of "Z axis" of the cathode ray tube 31. Choice of the type of cathode ray tube used is governed by the need for high resolution and brightness necessary to record desired bandwidths. The sweep generator 25 is operatively coupled to the cathode ray tube 31 over a composite lead 41 which conducts the required deflection and control signals, in a manner well known in the art. Synchronization signals developed by an appropriate detecting means situated to monitor the rotation rate of mirror 14, such as a light source 17 used in combination with a photodiode 18 and a pulse shaping network 42, will be applied as input signals over a lead 19 to the sweep generator 25, said synchronizaton signals serving to control the phase and frequency of the deflection signals applied to said deflection coils 218. It is understood that it would be within the scope and spirit of the invention to employ any suitable detecting means for monitoring the rotation rate of mirror 14 and for providing a plurality of pulses for synchronization purposes. The same synchronization signals serve to control the phase and frequency of horizontal sawtooth waveforms which are generated by sweep generator 25 and which are applied as input signals to cathode ray tube 31 to control the sweep of said tube 31. Line images produced on the face of the cathode ray tube 31 are focused on a portion of a conventional photographic film 35 by means of an appropriate optical lens structure 32. Film 35 may be driven by a drive motor 34 which may include, for example, a variable speed motor coupled to a capstan gear. The speed of the motor 34 may be controlled by a variable frequency oscillator 38 which may be a voltage controlled oscillator adapted to correct the speed of motor 34 for any desired V/h ratio which may be represented by a voltage magnitude.

There are certain fundamental requirements that all strip scan ground mapping systems must meet. The pattern scanned over the terrain should at least be contiguous or preferably have some overlap. In addition, true space proportions should be maintained. That is, accuracy of the map in the X direction should match that in the Y direction.

To control these factors during changes in aircraft altitude and/or ground speed, certain system parameters must be varied. These parameters are a function only of the relative speed of forward motion (V, ground speed), terrain clearances (h altitude), or the ratio, V/h. Either manual or automatic insertion of these parameters into the equipment must be provided. In the system illustrated by FIG. 2, V/h data is applied to drive motor 15 over a lead 19, to sweep generator 25 over a lead 29 and to variable frequency oscillator 38 over a lead 39. Standard navigational equipment (not shown) such as a velocity sensor and an altimeter aboard the aircraft may be used to provide V and h electrical analogue functions, respectively. An analogue dividing circuit may be used to develop a voltage signal representative of the V/h data.

Summarizing the operation of the illustrated system of the invention, a laser beam 16 provided by laser 11 is directed through collimating optics 13 to a rotating mirror 14. The collimated laser beam is reflected off mirror 14 towards the terrain beneath the aircraft on which the system is housed. The laser beam is caused to scan the terrain due to the rotation of the multisided mirror 14, said rotation being provided by drive motor 15 as a function of V/h data applied over input lead 19. Light energy reflected from the terrain that is illuminated by said laser beam is detected by the receiver 20. The reflected light energy 21 passing through aperture stop 207 and the unobscured portion of corrector lens 201 to spherical primary mirror 202, which serves to reflect and thereby redirect said light energy 21 towards secondary mirror 203, as shown by arrows 220, is again reflected and focused by said secondary mirror 203 as a spot light image on curved lineal focal surface 204, as indicated by arrows 221, said focal surface being oriented in physical coincidence with the end 210 of fiber optic line-to-circle converter 23. Due to the properties of the optical objective 22 and the scanning of the transmitted laser beam 16 the spot light image will progressively trace a line on the curved lineal focal surface 204, a line image being thereby produced on said focal surface 204 corresponding to each scan of the transmitted laser beam. The line images are then transferred through fiber optic image converter 23 to the photocathode 208 image dissector tube 24, the geometrical configuration of said line images being converted from a lineal form to a circular form in the transfer due to the physical configuration of said fiber optic image converter 23. It is understood that it would be within the scope and spirit of the invention to modify the illustrative system described herein by omitting the fiber optic image converter 23 whenever the direct application of a line image to photocathode 208 is desired.

Video signals representative of the intensity of circular images incident upon photocathode 208 and having time relations representative of terrain features are produced at output lead 219 of image dissector tube 24 and applied over the lead 26 through the amplifier 37 to the intensity of grid of properly biased cathode ray tube 31. Images appearing on the face of cathode ray tube 31 are then focused through lens structure 32 onto film 35, a permanent record of the terrain scanned by laser beam 16 beneath the aircraft being thereby produced.

While preferred embodiments of the present invention have been described hereinabove it is intended that all matter contained in the above description and shown in the accompanying drawings shall be interpreted as illustrative and not in a limiting sense and that all modifications, constructions, and arrangements which fall within the ability of those skilled in the art and within the scope and spirit of the present invention may be made.

I claim:

1. A ground mapping system comprising:
   transmitter means for scanning a target area with a laser beam;
   receiver means for detecting light reflected from said target area being scanned, said receiver means including a lineal focal surface; optical means for forming images of the scanned target area along said lineal focal surface, said optical means including a spherical corrector lens, a spherical primary mirror oriented in concentric juxtaposition to said corrector lens, and a secondary mirror mounted on the surface of said corrector lens adjacent to said spherical primary mirror; and means for electronically scanning said lineal focal surface including image dissecting tube means for generating signals representative of the intensity of said images formed along said lineal focal surface, and converter means for converting the geometrical configuration of said images formed along said lineal focal surface and for applying the converted images to said image dissecting tube means; and
   recorder means for producing a record of the light reflected from said target area.

2. The system of claim 1 wherein said converter means comprises a plurality of fiber optic bundles wherein a first end of said converter means has a first transverse shape and a second end has a second transverse shape.

3. A ground mapping system comprising:
   a transmitter including laser means for providing a beam of coherent light and means for causing said beam of coherent light to scan across a target area under observation;
   a receiver including optical means for focusing light reflected from said target area along a curved focal surface thereby providing images of the scanned target area along said curved focal surface, said optical means including a spherical corrector lens having a concave surface and a convex surface, a spherical primary mirror oriented in concentric juxtaposition to said convex surface of said corrector lens, a secondary mirror supported by the convex surface of said corrector lens, and aperture stop means for controlling the quantity of reflected light applied to said corrector lens whereby said aperture stop means is oriented at the center of curvature of said corrector lens; and means for electronically scanning said curved focal surface and for producing signals representative of said images; and
   recorder means for producing a record representative of said images formed along said curved focal surface.

4. The system of claim 3 wherein said means for electronically scanning said curved focal surface includes:
   an image dissecting tube means for generating video signals representative of the intensity of images applied thereto; and
   converter means for altering the geometrical form of said images formed along said curved focal surface and for applying the altered images to said image dissecting tube means.

5. The system of claim 4 wherein said image dissecting tube means comprises: a faceplate having an interior surface;
   photocathode means deposited on said interior surface of said faceplate for emitting photoelectrons upon the incidence of photons applied to said faceplate;
   electron multiplier means comprising an aperture and a plurality of stages for amplifying the effect of photoelectrons directed through said aperture; and
   accelerating means for accelerating said photoelectrons toward said aperture of said electron multiplier.

6. The system of claim 5 wherein said converter means comprises a plurality of fiber optic bundles which are bonded together at their ends wherein a first end of said converter means has a transverse lineal shape and a second end is formed to have a transverse nonlinear shape said second end being oriented in operational adjacency to said image dissecting tube means.

7. In a system including a transmitter having means for providing a beam of electromagnetic energy and means for scanning a target area under observation with said beam of electromagnetic energy thereby providing coverage of said target area, receiving means for receiving portions of said electromagnetic energy reflected from said target area, and recorder means for providing a record of the electromagnetic energy received by said receiver means, said receiver comprising:
   optical means for forming images of said reflected electromagnetic energy along a focal surface, said optical means including a corrector lens having a concave surface and a convex surface, a spherical primary mirror oriented in concentric juxtaposition with the convex surface of said lens, a secondary mirror deposited on the convex surface of said corrector lens and having the configuration of a narrow strip, and aperture stop means for controlling the quantity of reflected electromagnetic energy applied to said lens wherein said aperture stop means is oriented at the center of curvature of said corrector lens; and
   means for electronically scanning said focal surface and for producing electrical signals representative of the characteristics of said images formed along said focal surface, and said means for electronically scanning including an image dissector tube and converter means for converting the geometrical form of said images formed at said focal surface and for applying the converted images to said image dissector tube.

8. The system of claim 7 wherein said converter means comprises:
   a plurality of fiber optic bundles arranged in a coherent configuration and bonded together at the ends whereby a first end of said converter means has a transverse lineal shape and a second end has a transverse circular shape, said second end being physically oriented in operational abutment with said image dissecting means.

9. The system of claim 8 wherein said electromagnetic energy is in the form of light.

10. The system of claim 9 wherein said image dissecting tube means comprises:
    a faceplate adapted to have exterior and interior surfaces;
    photocathode means deposited on the interior surface of said faceplate for emitting photoelectrons upon the application of said converted images to said faceplate;
    electron multiplier means comprising an aperture and a plurality of stages for providing amplification of the effect of photoelectrons directed through said aperture; and
    a plurality of accelerating means for accelerating said photoelectrons toward said aperture.